(12) United States Patent
Cheng et al.

(10) Patent No.: US 7,834,608 B2
(45) Date of Patent: Nov. 16, 2010

(54) FEED-FORWARD COMPENSATION FOR A HYSTERETIC SWITCHING REGULATOR

(75) Inventors: Dongjie Cheng, Murphy, TX (US); Joao Carlos Felicio Brito, Murphy, TX (US); Juergen Luebbe, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 203 days.

(21) Appl. No.: 12/273,081

(22) Filed: Nov. 18, 2008

(65) Prior Publication Data

US 2010/0123446 A1     May 20, 2010

(51) Int. Cl.
     *G05F 5/00*      (2006.01)
(52) U.S. Cl. .................. 323/299; 323/288; 323/285
(58) Field of Classification Search ............ 323/271, 323/285, 288, 299, 300, 301
     See application file for complete search history.

(56) References Cited

U.S. PATENT DOCUMENTS

| | | | |
|---|---|---|---|
| 6,661,216 B1 * | 12/2003 | Grant et al. ............ | 323/282 |
| 7,042,203 B2 * | 5/2006 | Van Der Horn et al. ... | 323/285 |
| 2004/0051510 A1 * | 3/2004 | Saggini et al. ........... | 323/282 |
| 2009/0058383 A1 * | 3/2009 | Ryoo ...................... | 323/282 |
| 2009/0237049 A1 * | 9/2009 | Hachiya et al. ........... | 323/282 |

* cited by examiner

*Primary Examiner*—Bao Q Vu
*Assistant Examiner*—Nguyen Tran
(74) *Attorney, Agent, or Firm*—Dawn V. Stephens; Wade James Brady, III; Frederick J. Telecky, Jr.

(57) ABSTRACT

One embodiment of the invention includes a hysteretic power regulator system. The system includes a switching stage configured to periodically couple an input voltage to an inductor in response to a control signal to generate an output voltage. The system also includes a hysteretic control stage configured to generate the control signal based on a comparison of a feedback voltage associated with the output voltage and a predetermined reference voltage. The system also includes a feed-forward stage configured to generate a feed-forward ramp voltage in response to the control signal. The feed-forward ramp voltage can be added to the feedback voltage to set a frequency of the control signal. The system further includes a compensation stage configured to cancel a DC error associated with the feed-forward ramp voltage relative to the feedback voltage to substantially mitigate errors associated with the output voltage.

20 Claims, 5 Drawing Sheets

US 7,834,608 B2

FEED-FORWARD COMPENSATION FOR A HYSTERETIC SWITCHING REGULATOR

TECHNICAL FIELD

This invention relates to electronic circuits, and more particularly to feed-forward compensation for a hysteretic switching regulator.

BACKGROUND

There is an ever increasing demand for power conversion and regulation circuitry to operate with increased efficiency and reduced power to accommodate the continuous reduction in size of electronic devices. Switching regulators have been implemented as an efficient mechanism for providing a regulated output in power supplies. One such type of regulator is known as a switching regulator or switching power supply, which controls the flow of power to a load by controlling the on and off duty-cycle of one or more switches coupled to the load. Many different classes of switching regulators exist today.

One such type of switching regulator is a hysteretic switching regulator. A hysteretic switching regulator can be configured with a self-oscillating controller that regulates an output voltage by maintaining the output voltage to within a hysteresis window of a reference voltage. Hysteretic switching regulators can provide fast transient response with excellent dynamic power delivery characteristics. Specifically, hysteretic switching regulators are typically configured without an error amplifier, such that the feedback loop of a hysteretic switching regulator can respond much quicker than a typical switching regulator that includes an error amplifier. Hysteretic switching regulators can be implemented in any of a variety of applications, such as for power management in hard disk-drives.

SUMMARY

One embodiment of the invention includes a hysteretic power regulator system. The system includes a switching stage configured to periodically couple an input voltage to an inductor in response to a control signal to generate an output voltage. The system also includes a hysteretic control stage configured to generate the control signal based on a comparison of a feedback voltage associated with the output voltage and a predetermined reference voltage. The system also includes a feed-forward stage configured to generate a feed-forward ramp voltage in response to the control signal. The feed-forward ramp voltage can be added to the feedback voltage to set a frequency of the control signal. The system further includes a compensation stage configured to cancel a DC error associated with the feed-forward ramp voltage relative to the feedback voltage to substantially mitigate errors associated with the output voltage.

Another embodiment of the invention includes a method for providing feed-forward compensation in a hysteretic switching regulator. The method includes activating at least one switch to periodically couple an input voltage to an inductor in response to a control signal provided from a hysteretic control stage to generate an output voltage. The method also includes generating a feed-forward ramp voltage in response to the control signal and adding the feed-forward ramp voltage to a feedback voltage associated with the output voltage to set a frequency of the control signal. The method also includes measuring a DC error associated with the feed-forward ramp voltage relative to the feedback voltage and generating a compensation voltage that is associated with the measured DC error of the feed-forward ramp voltage. The method further includes providing the compensation voltage to an input of the hysteretic control stage to substantially mitigate errors associated with the output voltage.

Another embodiment of the invention includes a hysteretic power regulator system. The system includes means for periodically coupling an input voltage to an inductor in response to the control signal to generate an output voltage and means for generating a feed-forward ramp voltage in response to the control signal. The system also includes means for setting a frequency associated with the control signal based on a relative magnitude of a reference signal and a combination of the feed-forward ramp voltage and a feedback voltage that is associated with the output voltage. The system also includes means for measuring a DC error associated with the feed-forward ramp voltage relative to the feedback voltage. The system further includes means for generating a compensation voltage that is associated with the DC error associated with the feed-forward ramp voltage to substantially cancel the DC error to substantially mitigate errors associated with the output voltage.

DETAILED DESCRIPTION

Figure 1:
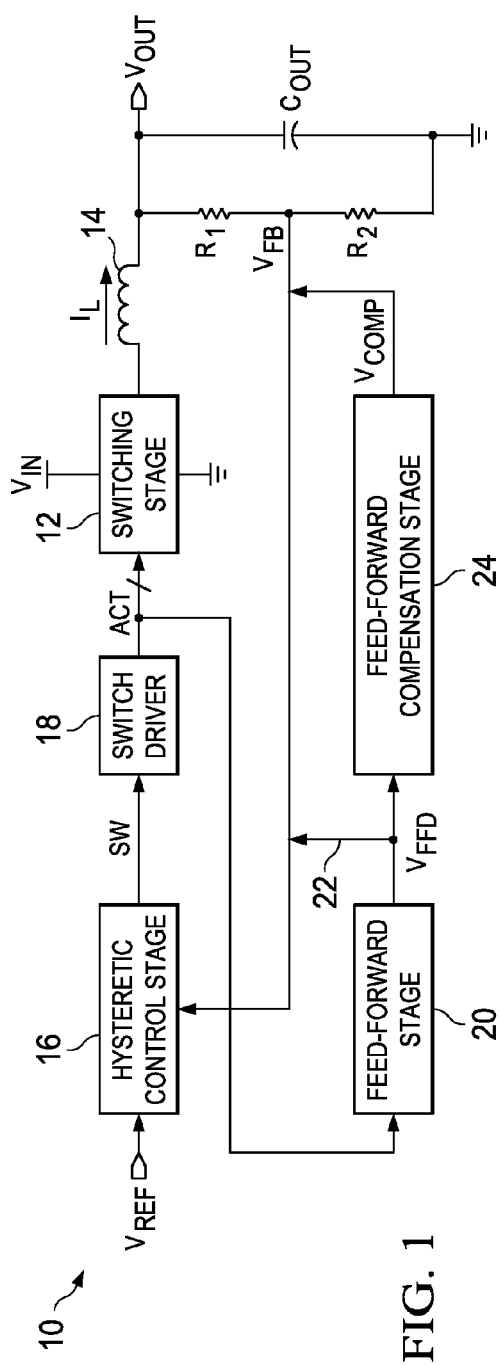
FIG. 1 illustrates an example of a hysteretic switching regulator system in accordance with an aspect of the invention.

The invention relates to electronic circuits, and more particularly to feed-forward compensation for a hysteretic switching regulator. The hysteretic switching regulator can include a switching stage that periodically couples an inductor to an input voltage, such as provided from a high voltage rail, to regulate an output voltage. Therefore, a current is provided through the inductor to generate the output voltage, such as via a capacitor. The switching stage can be controlled via a control signal that is generated from a hysteretic control stage. As an example, the hysteretic control stage can include a hysteresis comparator that generates the control signal based on a comparison between the magnitudes of a feedback voltage that is associated with the output voltage and a reference voltage. For example, the feedback voltage can include a feed-forward ramp voltage component, and the reference voltage can be modulated to define a hysteresis window for the comparator that dictates a logic state of the control signal.

The feed-forward ramp voltage can be generated based on alternately activating a first current source to charge a ramp capacitor and activating a second current source to discharge the ramp capacitor. The feed-forward ramp voltage can thus be the voltage across the ramp capacitor. Therefore, the feed-forward ramp voltage is combined with the feedback voltage to set a frequency of the control signal, and thus the switching stage, independent of the input voltage and the output voltage.

To ensure accuracy in the DC output voltage magnitude, the first and second current sources can be specified to set a magnitude of a DC component of the feed-forward ramp voltage to be approximately equal to the feedback voltage. This can be done for a known duty-cycle associated with a known output voltage. However, the feedback voltage can typically be a voltage-divided version of the output voltage, which can be configured by a user of the hysteretic switching regulator based on external components. Thus, the magnitude of the output voltage, and thus the duty-cycle, can be unknown at the time of fabrication of the hysteretic switching regulator, resulting in a DC error associated with the feed-forward ramp voltage relative to the feedback voltage. The unknown duty-cycle of the control signal can result in errors associated with the output voltage.

To substantially mitigate errors in the output voltage, the hysteretic switching regulator includes a feed-forward compensation stage that is configured to measure the DC error of the feed-forward ramp voltage and to generate a compensation voltage that substantially cancels the error associated with the feed-forward ramp voltage relative to the feedback voltage. As an example, the feed-forward compensation stage can include a low-pass filter that can measure the DC error of the feed-forward ramp voltage at an input of an operational amplifier (OP-AMP) that generates the compensation voltage. The compensation voltage can be subtracted from one of the feedback voltage or the feed-forward ramp voltage, or the compensation voltage can be added to the reference voltage to cancel the DC error of the feed-forward ramp voltage. Accordingly, the reference voltage, the feedback voltage, and the feed-forward ramp voltage can have correct magnitudes to generate an accurate output voltage.

FIG. 1 illustrates an example of a hysteretic switching regulator system 10 in accordance with an aspect of the invention. As an example, the hysteretic switching regulator system 10 can be implemented in any of a variety of applications that require a rapid transient response to changing load conditions. For example, the hysteretic switching regulator system 10 can be implemented as a fast transient response power supply for hard disk-drives, microprocessors, and/or digital signal processors (DSPs).

The hysteretic switching regulator system 10 includes a switching stage 12 that is coupled between an input voltage $V_{IN}$ provided from a high voltage rail and a low voltage rail, demonstrated in the example of FIG. 1 as ground. The switching stage 12 can include at least one switch that periodically couples the input voltage $V_{IN}$ to an inductor 14 in response to a respective one or more activation signals ACT to generate a current $I_L$ through the inductor 14. For example, the switching stage 12 can include a high-side switch and a low-side switch that are mutually exclusively activated to alternately couple the inductor 14 to the input voltage $V_{IN}$ and ground. Therefore, an output voltage $V_{OUT}$ can be regulated through a load (not shown) via an output capacitor $C_{OUT}$ based on the current $I_L$.

In the example of FIG. 1, a feedback voltage $V_{FB}$ is generated based on the output voltage $V_{OUT}$. Specifically, the feedback voltage $V_{FB}$ is demonstrated as having a voltage-divided magnitude of the output voltage $V_{OUT}$ via a pair of resistors $R_1$ and $R_2$. The feedback voltage $V_{FB}$ is provided to a hysteretic control stage 16 along with a reference voltage $V_{REF}$. As an example, the reference voltage $V_{REF}$ can have a predetermined magnitude that can set an expected magnitude of the output voltage $V_{OUT}$. For example, the hysteretic control stage 16 can include a hysteretic comparator that compares a magnitude of the feedback voltage $V_{FB}$ with the magnitude of the reference voltage $V_{REF}$. Thus, the hysteretic control stage 16 can generate a switching control signal SW having a defined logic state based on the comparison of the feedback voltage $V_{FB}$ and the reference voltage $V_{REF}$. For example, the hysteretic control stage 16 can assert (i.e., logic-high) and de-assert (i.e., logic-low) the switching control signal SW to maintain the feedback voltage $V_{FB}$ to within a hysteresis window of the reference voltage $V_{REF}$.

The switching control signal SW is provided to a switch driver 18 that is configured to generate the one or more activation signals ACT. As an example, the switch driver 18 can include an arrangement of buffers and/or inverters to convert the switching control signal SW into a high-side activation signal and a low-side activation signal that collectively constitute the activation signals ACT. Therefore, in the example of FIG. 1, the comparison of the feedback voltage $V_{FB}$ and the reference voltage $V_{REF}$ sets the logic state of the switching control signal SW, which in turn sets the magnitude of the output voltage $V_{OUT}$ based on the switching frequency of the one or more switches in the switching stage 12.

The hysteretic switching regulator system 10 also includes a feed-forward stage 20. The feed-forward stage 20 is configured to generate a feed-forward ramp voltage $V_{FFD}$ in response to the activation signals ACT. As an example, the activation signals ACT can be configured to alternately activate a pair of current sources to respectively charge and discharge a ramp capacitor that sets the feed-forward ramp voltage $V_{FFD}$. As demonstrated in the example of FIG. 1, the feed-forward ramp voltage $V_{FFD}$ is combined with the feedback voltage $V_{FB}$, as demonstrated by the arrow 22. Because the feed-forward ramp voltage $V_{FFD}$ is combined with the feedback voltage $V_{FB}$, the switching control signal SW can be set at a higher frequency that is independent of the input voltage $V_{IN}$ and the output voltage $V_{OUT}$. It is to be understood that the arrow 22 is not intended to show that the feed-forward ramp voltage $V_{FFD}$ is combined directly with the feedback voltage $V_{FB}$, but that one or more interposing resistive and/or buffering components can be interposed between the feed-forward ramp voltage $V_{FFD}$ and the feedback voltage $V_{FB}$, as demonstrated in greater detail in the example of FIG. 2.

The switching stage 12, the hysteretic control stage 16, the switch driver 18, and the feed-forward stage 20 can all be implemented in an integrated circuit (IC), such that an end-user of the hysteretic switching regulator system 10 may configure one or more of the inductor 14, the resistors $R_1$ and $R_2$, and the output capacitor $C_{OUT}$ as external components. Variations in the characteristics of the external components, such as changes in a ratio between the resistors $R_1$ and $R_2$, could result in variations in the magnitude of the output voltage $V_{OUT}$. Specifically, the variations in the output voltage $V_{OUT}$ can result from the hysteretic switching regulator 10 constantly regulating the feedback voltage $V_{FB}$ to within the hysteresis window centered at the reference voltage $V_{REF}$. A change in the output voltage $V_{OUT}$ can thus result in a change in the duty-cycle of the switching control signal SW, and thus the switching stage 12, that is a deviation from the manner in which the IC is designed.

As an example, a user could configure one or more external voltage dividers to program various outputs, but could provide only a single fixed feedback voltage $V_{FB}$ that is supposed to be approximately equal to the reference voltage $V_{REF}$ to the IC that includes the internal components of the hysteretic switching regulator system 10. However, the feed-forward stage 20 can only be configured for a specific magnitude of the output voltage $V_{OUT}$ to provide a fixed magnitude of a DC component of the feed-forward ramp voltage $V_{FFD}$ that is approximately equal to an expected feedback voltage $V_{FB}$ to provide the specified magnitude of the output voltage $V_{OUT}$. Specifically, the one or more current sources in the feed-forward stage 20 can be activated and deactivated synchronously with the duty-cycle of the switching control signal SW to provide fixed current magnitudes that are designed for the specified magnitude of the output voltage $V_{OUT}$. Variations in the duty-cycle can result in a DC error in the feed-forward ramp voltage $V_{FFD}$ relative to the feedback voltage $V_{FB}$, which can thus result in errors in the output voltage $V_{OUT}$.

To substantially mitigate the errors in the output voltage $V_{OUT}$, the hysteretic switching regulator system 10 includes a feed-forward compensation stage 24. The feed-forward compensation stage 24 is configured to measure the DC error associated with the feed-forward ramp voltage $V_{FFD}$. Upon determining the DC error of the feed-forward ramp voltage $V_{FFD}$, the feed-forward compensation stage 24 generates a compensation voltage $V_{COMP}$ that is combined with the feedback voltage $V_{FB}$ to substantially cancel the DC error associated with the feed-forward ramp voltage $V_{FFD}$. Specifically, since the feed-forward ramp voltage $V_{FFD}$ is combined with the feedback voltage $V_{FB}$, then the compensation voltage $V_{COMP}$ is subtracted from the feedback voltage $V_{FB}$ to cancel the DC error that is added to the feedback voltage $V_{FB}$ based on the combination of the feed-forward ramp voltage $V_{FFD}$ to the feedback voltage $V_{FB}$. Therefore, the hysteretic control stage 16 can compare the reference voltage $V_{REF}$ to the feedback voltage $V_{FB}$ that is substantially free of the DC error component of the feed-forward ramp voltage $V_{FFD}$. Accordingly, the duty-cycle of the switching control signal SW can be generated in such a manner as to ensure that the output voltage $V_{OUT}$ is regulated via the switching stage 12 with substantially no error.

It is to be understood that the hysteretic switching regulator system 10 is not intended to be limited to the example of FIG. 1. As an example, the hysteretic switching regulator system 10 is demonstrated as a buck switching regulator. However, the hysteretic switching regulator system 10 can likewise be configured as any of a variety of other types of switching regulators, such as a boost, a negative switching, or a buck-boost regulator. Similarly, as another example, the inductor 14, the output capacitor $C_{OUT}$, and the resistors $R_1$ and $R_2$ could be arranged differently to provide the output voltage $V_{OUT}$ and/or the feedback voltage $V_{FB}$. As another example, the compensation voltage $V_{COMP}$ can be provided to substantially cancel the DC error in other manners, such as demonstrated in the examples of FIGS. 3 and 4 below. Accordingly, the hysteretic switching regulator system 10 can be configured in any of a variety of ways.

Figure 2:
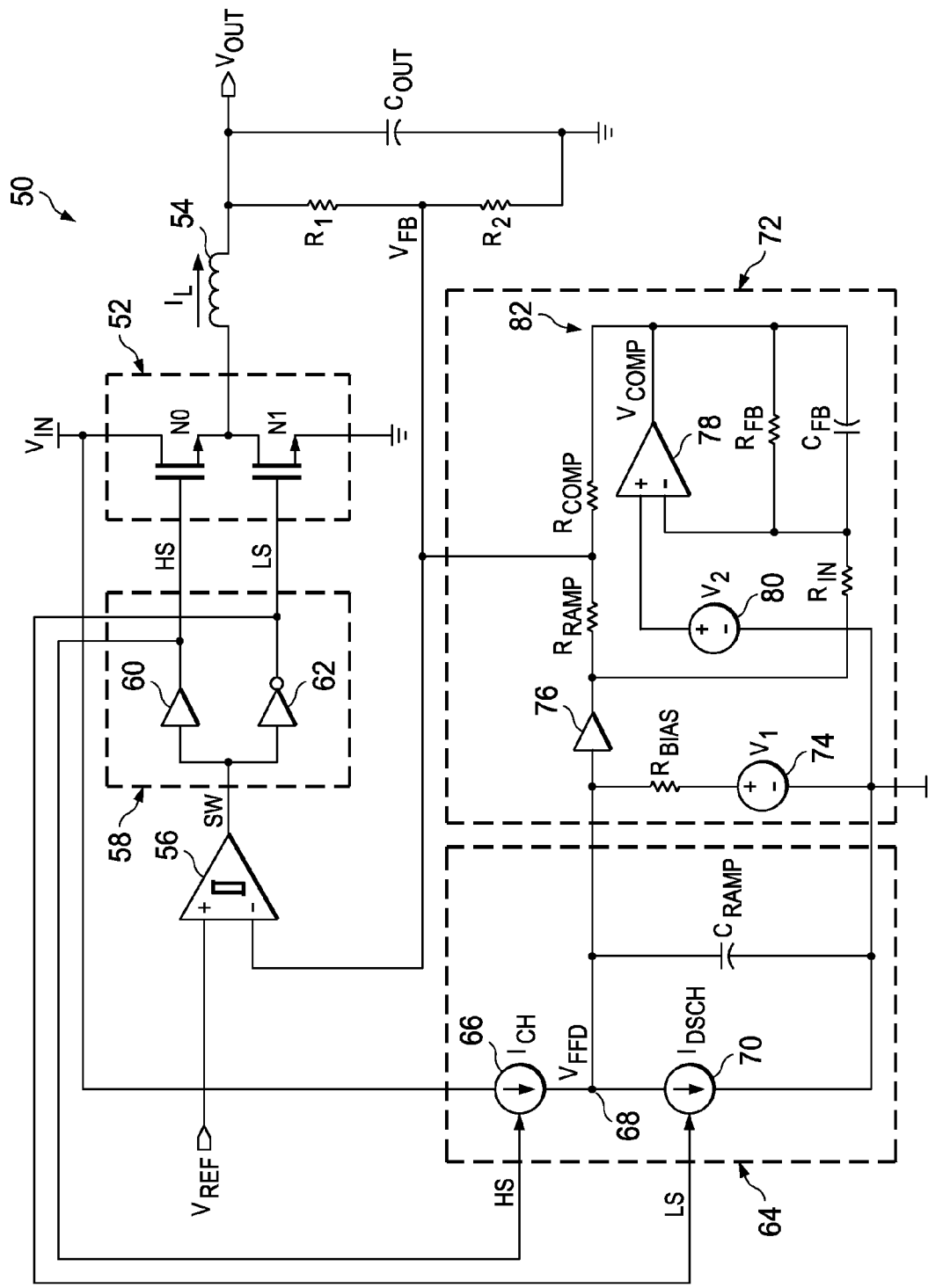
FIG. 2 illustrates an example of a hysteretic switching regulator circuit in accordance with an aspect of the invention.

FIG. 2 illustrates an example of a hysteretic switching regulator circuit 50 in accordance with an aspect of the invention. Similar to the hysteretic switching regulator system 10 in the example of FIG. 1, the hysteretic switching regulator circuit 50 can be implemented in any of a variety of applications that require a rapid transient response to changing load conditions, such as hard disk-drives, microprocessors, and/or DSPs. The hysteretic switching regulator circuit 50 can be configured substantially similar to the hysteretic switching regulator system 10 in the example of FIG. 1. Therefore, reference can be made to the example of FIG. 1 in the example of FIG. 2.

The hysteretic switching regulator circuit 50 includes a switching stage 52 that is coupled between an input voltage $V_{IN}$ provided from a high voltage rail and a low voltage rail, demonstrated in the example of FIG. 2 as ground. In the example of FIG. 2, the switching stage 52 includes an N-channel field effect transistor (FET) N0 configured as a high-side transistor and an N-channel FET N1 configured as a low-side transistor. The N-FET N0 and the N-FET N1 can be alternately activated by a high-side activation signal HS and a low-side activation signal LS, respectively, to alternately couple the input voltage $V_{IN}$ and ground to an inductor 54 to generate a current $I_L$ through the inductor 54. The current $I_L$, along with an output capacitor $C_{OUT}$, can thus regulate a magnitude of an output voltage $V_{OUT}$ through a load (not shown) based on the respective switching duty-cycle of the N-FETs N0 and N1.

In the example of FIG. 2, the output voltage $V_{OUT}$ is divided via a voltage divider formed by a pair of resistors $R_1$ and $R_2$. Therefore, the resistors $R_1$ and $R_2$ generate a feedback voltage $V_{FB}$ based on the magnitude of the output voltage $V_{OUT}$. The feedback voltage $V_{FB}$ is provided to an inverting input of a hysteretic comparator 56, and a reference voltage $V_{REF}$ is provided to a non-inverting input of the hysteretic comparator 56. As an example, the reference voltage $V_{REF}$ can have a programmable magnitude that can set an expected magnitude of the output voltage $V_{OUT}$. Therefore, the hysteretic comparator 56 can generate a switching control signal SW based on a magnitude of the feedback voltage $V_{FB}$ relative to upper and lower limits of a hysteresis window centered at the reference voltage $V_{REF}$. Therefore, the hysteretic comparator 56 is configured as a control stage to set a logic state of the switching control signal SW based on the comparison of the feedback voltage $V_{FB}$ and the reference voltage $V_{REF}$.

The switching control signal SW is provided to a switch driver 58 that is configured to generate the high-side and low-side activation signals HS and LS. In the example of FIG. 2, the switch driver 58 includes a buffer 60 that generates the high-side activation signal HS in response to the switching control signal SW, and also includes an inverter 62 that generates the low-side activation signal LS in response to the switching control signal SW. Therefore, in the example of FIG. 2, the N-FETs N0 and N1 are alternately activated based on a logic-state of the switching control signal SW. Accordingly, the comparison of the feedback voltage $V_{FB}$ and the reference voltage $V_{REF}$ sets the logic state of the switching control signal SW, which in turn regulates the magnitude of the output voltage $V_{OUT}$ based on the alternate switching operation of the N-FETs N0 and N1 in the switching stage 52.

The hysteretic switching regulator circuit 50 also includes a feed-forward stage 64. The feed-forward stage 64 includes a first current source 66 that is activated in response to the high-side activation signal HS to conduct a charging current $I_{CH}$ from the input voltage $V_{IN}$ to a node 68. The feed-forward stage 64 also includes a second current source 70 that is activated in response to the low-side activation signal LS to conduct a discharging current $I_{DSCH}$ from the node 68 to ground. The feed-forward stage 64 further includes a ramp capacitor $C_{RAMP}$ that interconnects the node 68 and ground. Therefore, the ramp capacitor $C_{RAMP}$ is thus configured to generate the feed-forward ramp voltage $V_{FFD}$ in response to the charging current $I_{CH}$ and the discharging current $I_{DSCH}$. Specifically, upon the high-side activation signal HS being asserted, the charging current $I_{CH}$ charges the ramp capacitor $C_{RAMP}$ to increase the magnitude of the feed-forward ramp voltage $V_{FFD}$. Similarly, upon the low-side activation signal LS being asserted, the discharging current $I_{DSCH}$ discharges the ramp capacitor $C_{RAMP}$ to ground to decrease the magnitude of the feed-forward ramp voltage $V_{FFD}$. As described in greater detail below, the feed-forward ramp voltage $V_{FFD}$ is combined with the feedback voltage $V_{FB}$. Therefore, the switching control signal SW is set by the hysteretic comparator 56 at a frequency that is independent of the input voltage $V_{IN}$ and the output voltage $V_{OUT}$.

The switching stage 52, the hysteretic comparator 56, the switch driver 58, and the feed-forward stage 64 can all be implemented in an IC, such that an end-user of the hysteretic switching regulator circuit 50 may configure one or more of the inductor 54, the resistors $R_1$ and $R_2$, and the output capacitor $C_{OUT}$ as external components. The characteristics of the external components can be unknown at the time that the IC is designed. Therefore, the feedback voltage $V_{FB}$ that is fed back into the IC can include a DC component of the feed-forward ramp voltage $V_{FFD}$ that can have a magnitude that varies from the reference voltage $V_{REF}$ based on which the feed-forward stage 64 was designed with respect to the magnitudes of the charging current $I_{CH}$ and the discharging current $I_{DSCH}$ and a specific duty-cycle to provide the specified magnitude of the output voltage $V_{OUT}$. Specifically, a deviation in the magnitude of the DC component of the feed-forward ramp voltage $V_{FFD}$ relative to the reference voltage $V_{REF}$ can alter the duty-cycle of the switching control signal SW based on the comparison of the reference voltage $V_{REF}$ and the feedback voltage $V_{FB}$. Because the duty-cycle of the switching control signal SW affects the charging and discharging of the ramp capacitor $C_{RAMP}$, the feed-forward ramp voltage $V_{FFD}$ can exhibit an error in its DC component based on the unknown duty-cycle of the switching control signal SW. The DC error of the feed-forward ramp voltage $V_{FFD}$ can thus result in errors in the output voltage $V_{OUT}$.

The hysteretic switching regulator circuit 50 includes a feed-forward compensation stage 72. The feed-forward compensation stage 72 includes a voltage bias 74 that generates a voltage $V_1$ and a resistor $R_{BIAS}$ that interconnects the voltage bias 74 and the node 68. As an example, the voltage $V_1$ can be approximately equal to the reference voltage $V_{REF}$ to provide a balanced DC magnitude of the feed-forward ramp voltage $V_{FFD}$ when the magnitude of the feedback voltage $V_{FB}$ likewise approximately equal to the reference voltage $V_{REF}$. The feed-forward compensation stage 72 also includes a buffer 76 that is configured to buffer the feed-forward ramp voltage $V_{FFD}$ to substantially mitigate loading associated with the feed-forward compensation stage 72 and/or the hysteretic comparator 56.

The buffered feed-forward ramp voltage $V_{FFD}$ is provided to an inverting input of an OP-AMP 78 via an input resistor $R_{IN}$. A voltage source 80 provides a voltage $V_2$ to a non-inverting input of the OP-AMP 78. As an example, the voltage $V_2$ can have a magnitude that is approximately equal to the reference voltage $V_{REF}$. The OP-AMP 78 is arranged in a negative amplification configuration, such as to provide a negative gain. Specifically, a feedback resistor $R_{FB}$ and a feedback capacitor $C_{FB}$ interconnect an output node 82 of the OP-AMP 78 and the inverting input of the OP-AMP 78. The feedback resistor $R_{FB}$ and the feedback capacitor $C_{FB}$ are thus configured as a low-pass filter (LPF) at the inverting input of the OP-AMP 78. Therefore, the feed-forward ramp voltage $V_{FFD}$ is filtered at the inverting input of the OP-AMP 78 to provide a measurement of the DC error of the feed-forward ramp voltage $V_{FFD}$. Accordingly, the OP-AMP 78 generates the compensation voltage $V_{COMP}$ at the output node 82 based on a relative magnitude of the DC error of the feed-forward ramp voltage $V_{FFD}$ and the voltage $V_2$.

A ramp resistor $R_{RAMP}$ interconnects the buffered feed-forward ramp voltage $V_{FFD}$ and the feedback voltage $V_{FB}$ and a resistor $R_{COMP}$ interconnects the output node 82 and the feedback voltage $V_{FB}$. The compensation voltage $V_{COMP}$ is thus combined with the feedback voltage $V_{FB}$ via the resistor $R_{COMP}$, and the feed-forward ramp voltage $V_{FFD}$ is thus combined with the feedback voltage $V_{FB}$ via the resistor $R_{RAMP}$. Therefore, the DC error of the feed-forward ramp voltage $V_{FFD}$ is subtracted from the feed-forward ramp voltage $V_{FFD}$ at the feedback voltage $V_{FB}$. Thus, the feedback voltage $V_{FB}$ is provided to the inverting input of the hysteretic comparator 56 as having a DC component magnitude that is approximately equal to the reference voltage $V_{REF}$. Accordingly, the feed-forward compensation stage 72 substantially cancels the DC error of the feed-forward ramp voltage $V_{FFD}$ to substantially mitigate errors associated with the output voltage $V_{OUT}$ resulting from variation of the feedback voltage $V_{FB}$ based on variation of the duty-cycle of the switching control signal SW.

The effect of the DC error of the feed-forward ramp voltage $V_{FFD}$, and thus the operation of the feed-forward compensation stage 72 can be better explained as follows. Based on the operation of the OP-AMP 78, the compensation voltage $V_{COMP}$ is a quasi-DC signal that can be expressed as follows:

$$V_{COMP} = Av^*(V_{FFD} - V_2) + V_2 \qquad \text{Equation 1}$$

Where: Av is a gain associated with the OP-AMP 78.

Equation 1 can be rewritten as follows:

$$V_{COMP} = -(R_{FB}/R_{IN})^*(V_{FFD} - V_2) + V_2 \qquad \text{Equation 2}$$

The DC error of the feed-forward ramp voltage $V_{FFD}$ that is dependent on the duty-cycle of the switching control signal SW can be expressed as $dV_{FFD}$, which generates an offset for the feedback voltage $V_{FB}$ via the ramp resistor $R_{RAMP}$. Therefore, the change $\Delta V_{FB1}$ in the feedback voltage $V_{FB}$ resulting from the DC error of the feed-forward ramp voltage $V_{FFD}$ can be expressed as follows:

$$\Delta V_{FB1} = dV_{FFD}^*(R_1//R_2)/(R_1//R_2 + R_{RAMP}) \qquad \text{Equation 3}$$

$$\approx dV_{FFD}^*(R_1//R_2)/R_{RAMP} \qquad \text{Equation 4}$$

Where: $R_{RAMP} >> R_1//R_2$.

However, the compensation voltage $V_{COMP}$ also creates an offset for the feedback voltage $V_{FB}$ via the resistor $R_{COMP}$. The change $\Delta V_{FB2}$ in the feedback voltage $V_{FB}$ resulting from the compensation voltage $V_{COMP}$ can be expressed as follows:

$$\Delta V_{FB2} = dV_{FFD}^*Av^*(R_1//R_2)/((R_1//R_2) + R_{COMP}) \qquad \text{Equation 5}$$

$$\approx -dV_{FFD}^*(R_{FB}/R_{IN})^*(R_1//R_2)/R_{COMP} \qquad \text{Equation 6}$$

Where: $R_{COMP} >> R_1//R_2$.

To substantially mitigate the error in the output voltage $V_{OUT}$ based on the DC error $dV_{FFD}$, Equation 4 and Equation 6 are added together and set approximately equal to zero, resulting in the following expressions:

$$\Delta V_{FB1} + \Delta V_{FB2} = 0 \qquad \text{Equation 7}$$

$$(R_{FB}/R_{IN}) = (R_{COMP}/R_{RAMP}) \qquad \text{Equation 8}$$

Accordingly, the resistance magnitudes of the resistors $R_{FB}$, $R_{IN}$, $R_{COMP}$, and $R_{RAMP}$ can be selected to satisfy Equation 8, and thus to substantially mitigate error in the output voltage $V_{OUT}$ resulting from the DC error $dV_{FFD}$.

Figure 3:
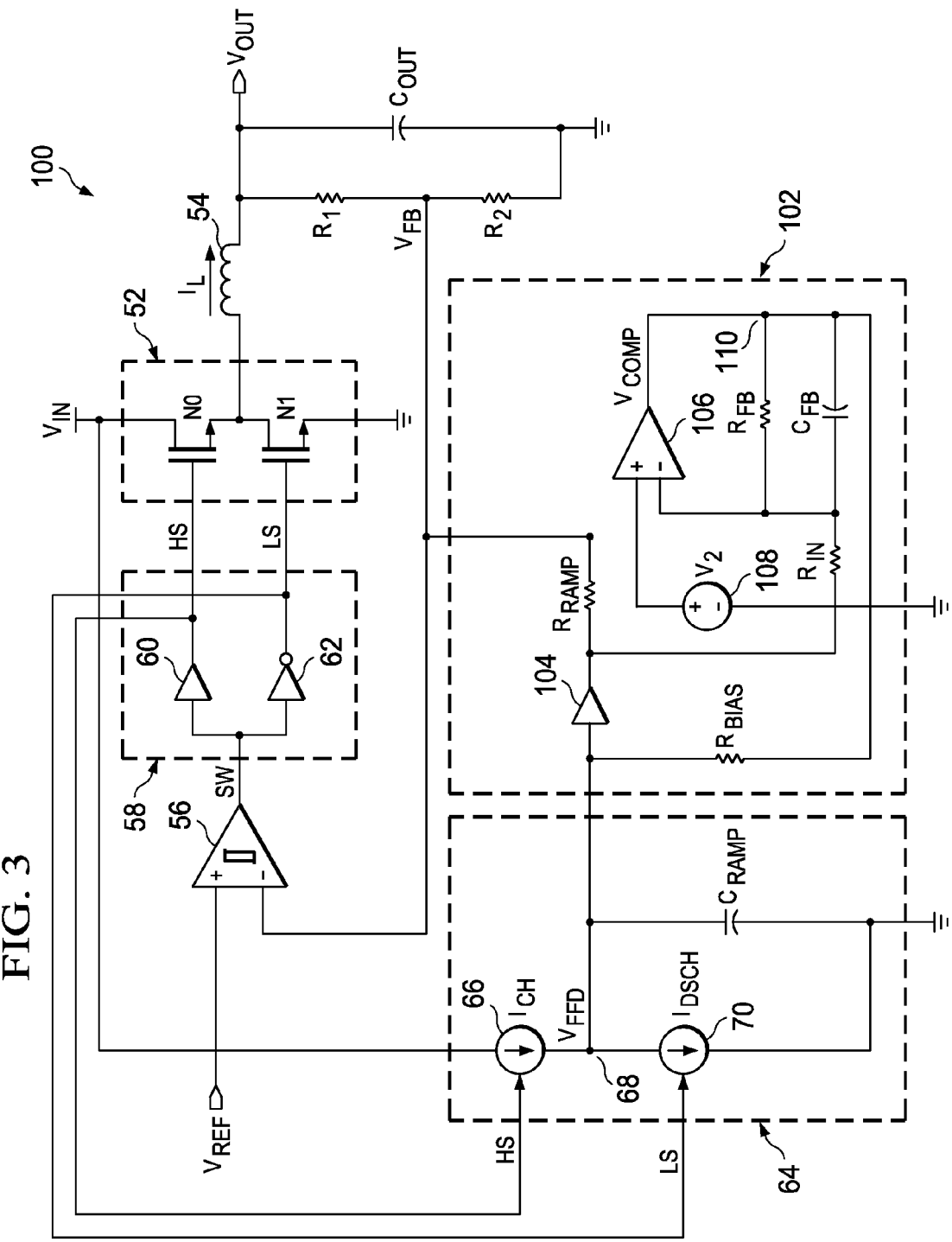
FIG. 3 illustrates another example of a hysteretic switching regulator circuit in accordance with an aspect of the invention.

FIG. 3 illustrates another example of a hysteretic switching regulator circuit 100 in accordance with an aspect of the invention. The hysteretic switching regulator circuit 100 in the example of FIG. 3 is demonstrated as configured substantially similar to the hysteretic switching regulator circuit 50 in the example of FIG. 2. As such, with the exception of the feed-forward compensation stage 72 in the example of FIG. 2, like reference numbers have been used in the description of the example of FIG. 3 as those used in the description of the example of FIG. 2. Specifically, the hysteretic switching regulator circuit 100 includes a switching stage 52, a hysteretic comparator 56, a switch driver 58, and a feed-forward stage 64 that can each operate in the manner described above in the example of FIG. 2.

The hysteretic switching regulator circuit 100 includes a feed-forward compensation stage 102. The feed-forward compensation stage 102 includes a buffer 104 that is configured to buffer the feed-forward ramp voltage $V_{FFD}$ to substantially mitigate loading associated with the feed-forward compensation stage 102 and/or the hysteretic comparator 56. Similar to as described above in the example of FIG. 2, the buffered feed-forward ramp voltage $V_{FFD}$ is provided to an inverting input of an OP-AMP 106 via an input resistor $R_{IN}$. A voltage source 108 provides a voltage $V_2$ that can have a magnitude that is approximately equal to the reference voltage $V_{REF}$ to a non-inverting input of the OP-AMP 106. Thus, the OP-AMP 106 is arranged in a negative amplification configuration, with a feedback resistor $R_{FB}$ and a feedback capacitor $C_{FB}$ interconnecting an output node 110 of the OP-AMP 106 and the inverting input of the OP-AMP 106 to form an LPF. Accordingly, the OP-AMP 106 generates the compensation voltage $V_{COMP}$ at the output node 110 based on a relative magnitude of the DC error of the feed-forward ramp voltage $V_{FFD}$ and the voltage $V_2$. It is to be understood that the feed-forward compensation stage 102 is not limited to the arrangement of the OP-AMP 106 and the feedback resistor $R_{FB}$ and capacitor $C_{FB}$ to achieve equivalent AC and DC characteristics.

In the example of FIG. 3, the compensation voltage $V_{COMP}$ is fed-back to the input of the buffer 104 via the resistor $R_{BIAS}$. Therefore, the compensation voltage $V_{COMP}$ is subtracted from the feed-forward ramp voltage $V_{RAMP}$ instead of as demonstrated in the example of FIG. 2 above in which the compensation voltage $V_{COMP}$ is subtracted from the feedback voltage $V_{FB}$. Therefore, the DC error of the feed-forward ramp voltage $V_{FFD}$ is subtracted from the feed-forward ramp voltage $V_{FFD}$ itself at the output node 110. A ramp resistor $R_{RAMP}$ interconnects the buffered feed-forward ramp voltage $V_{FFD}$ and the feedback voltage $V_{FB}$. The compensated feed-forward ramp voltage $V_{FFD}$ is thus combined with the feedback voltage $V_{FB}$ via a resistor $R_{RAMP}$. Thus, the feedback voltage $V_{FB}$ is provided to the inverting input of the hysteretic comparator 56 as having a DC component magnitude that is approximately equal to the reference voltage $V_{REF}$. Accordingly, the feed-forward compensation stage 102 substantially cancels the DC error of the feed-forward ramp voltage $V_{FFD}$ to substantially mitigate errors associated with the output voltage $V_{OUT}$ resulting from deviations of the feedback voltage $V_{FB}$ that affect the duty-cycle of the switching control signal SW.

The effect of the DC error of the feed-forward ramp voltage $V_{FFD}$, and thus the operation of the feed-forward compensation stage 102 can be mathematically explained similar to as described above in the example of FIG. 2. However, for the feed-forward compensation stage 102 in the example of FIG. 3, Equation 2 above can be ascertained, as well as the following Equation:

$$(V_{FFD} - V_{COMP})/(R_{BIAS}) = I_{CH} - I_{DSCH} \quad \text{Equation 9}$$

Solving Equation 2 and Equation 9, the following expression can be obtained:

$$V_{FFD} = V_2 + R_{BIAS} * (I_{CH} - I_{DSCH})/(1 + R_{FB}/R_{IN}) \quad \text{Equation 10}$$

In Equations 9 and 10, it is to be understood that the values of the charging and discharging currents $I_{CH}$ and $I_{DSCH}$ are average values over a duty-cycle. As described above, $V_{FFD}$ is approximately equal to $V_{REF}$, and thus approximately equal to $V_2$, when the currents $I_{CH}$ and $I_{DSCH}$ are substantially balanced. Therefore, Equation 10 demonstrates that the DC error $dV_{FFD}$ of the feed-forward ramp voltage $V_{FFD}$ due to an imbalance between the currents $I_{CH}$ and $I_{DSCH}$ is attenuated by a factor of approximately $(1+R_{FB}/R_{IN})$. Accordingly, the resistance magnitudes of the resistors $R_{FB}$ and $R_{IN}$ can be selected to satisfy Equation 10, and thus to substantially mitigate error in the output voltage $V_{OUT}$ resulting from the DC error $dV_{FFD}$.

It is to be understood that the hysteretic switching regulator circuits 50 and 100 are not intended to be limited to the examples of FIGS. 2 and 3. As an example, the hysteretic switching regulator circuits 50 and 100 are demonstrated as a buck switching regulator. However, the hysteretic switching regulator circuits 50 and 100 can likewise be configured as any of a variety of other types of switching regulators, such as a boost, a negative switching, or a buck-boost regulator. Similarly, as another example, the inductor 14, the output capacitor $C_{OUT}$, and the resistors $R_1$ and $R_2$ could be arranged differently to provide the output voltage $V_{OUT}$ and/or the feedback voltage $V_{FB}$. Furthermore, the feed-forward stage 64 and the feed-forward compensation stages 72 and 102 are not limited to as demonstrated in the example of FIGS. 2 and 3, such that any of a variety of circuit configurations can be implemented to generate the feed-forward ramp voltage $V_{FFD}$ and the compensation voltage $V_{COMP}$. Accordingly, the hysteretic switching regulator circuits 50 and 100 can be configured in any of a variety of ways.

Figure 4:
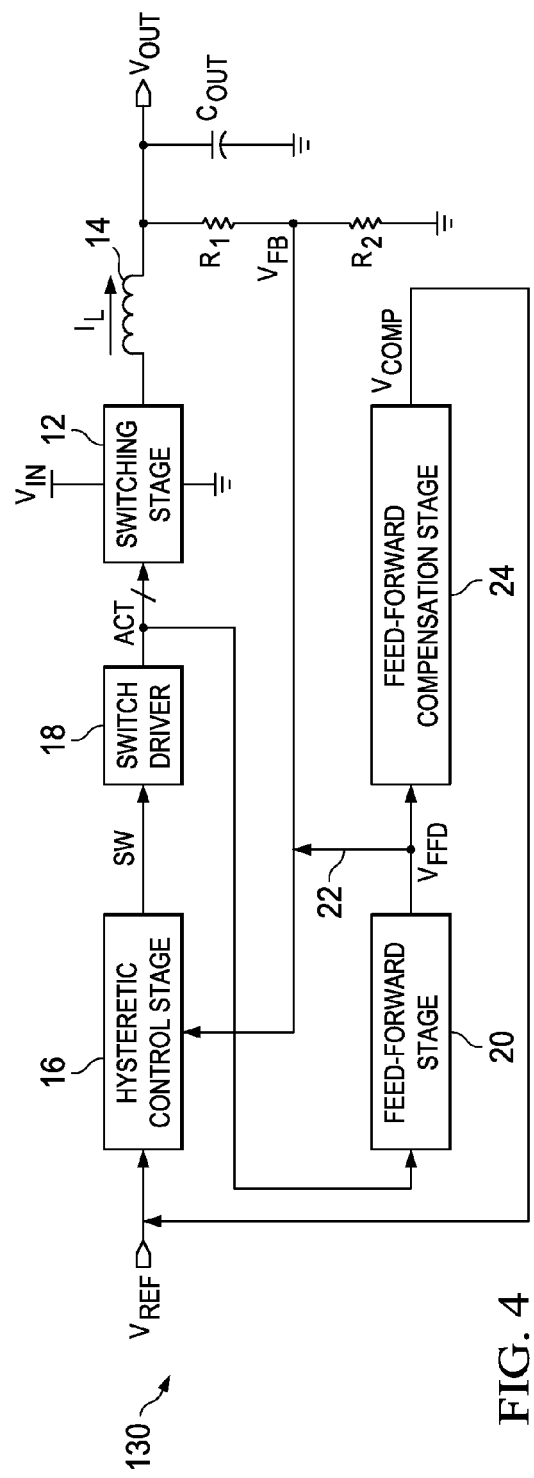
FIG. 4 illustrates another example of a hysteretic switching regulator system in accordance with an aspect of the invention.

FIG. 4 illustrates another example of a hysteretic switching regulator system 130 in accordance with an aspect of the invention. The hysteretic switching regulator system 130 is configured substantially similar to the hysteretic switching regulator system 10 in the example of FIG. 1. As such, reference is to be made to the example of FIG. 1 in the following description of FIG. 4, and like reference numbers are used in the following description of the example of FIG. 4 as those used in the example of FIG. 1.

The difference between the hysteretic switching regulator system 130 and the hysteretic switching regulator system 10 is demonstrated in the example of FIG. 4 as the manner in which the DC error of the feed-forward ramp voltage $V_{FFD}$ is cancelled. Specifically, in the example of FIG. 4, the compensation voltage $V_{COMP}$ that is generated by the feed-forward compensation stage 24 is combined with the reference voltage $V_{REF}$ instead of the feedback voltage $V_{FB}$. As an example, the compensation voltage $V_{COMP}$ is added to the reference voltage $V_{REF}$ at the input of the hysteretic control stage 16. As a result, both the feedback voltage $V_{FB}$ and the reference voltage $V_{REF}$ can include the DC error associated with the feed-forward ramp voltage $V_{FB}$. Therefore, the DC error of the feed-forward ramp voltage $V_{FFD}$ is substantially cancelled based on the DC error of the feed-forward ramp voltage $V_{FFD}$ being irrelevant to the comparison between the reference voltage $V_{REF}$ and the feedback voltage $V_{FB}$.

Figure 5:
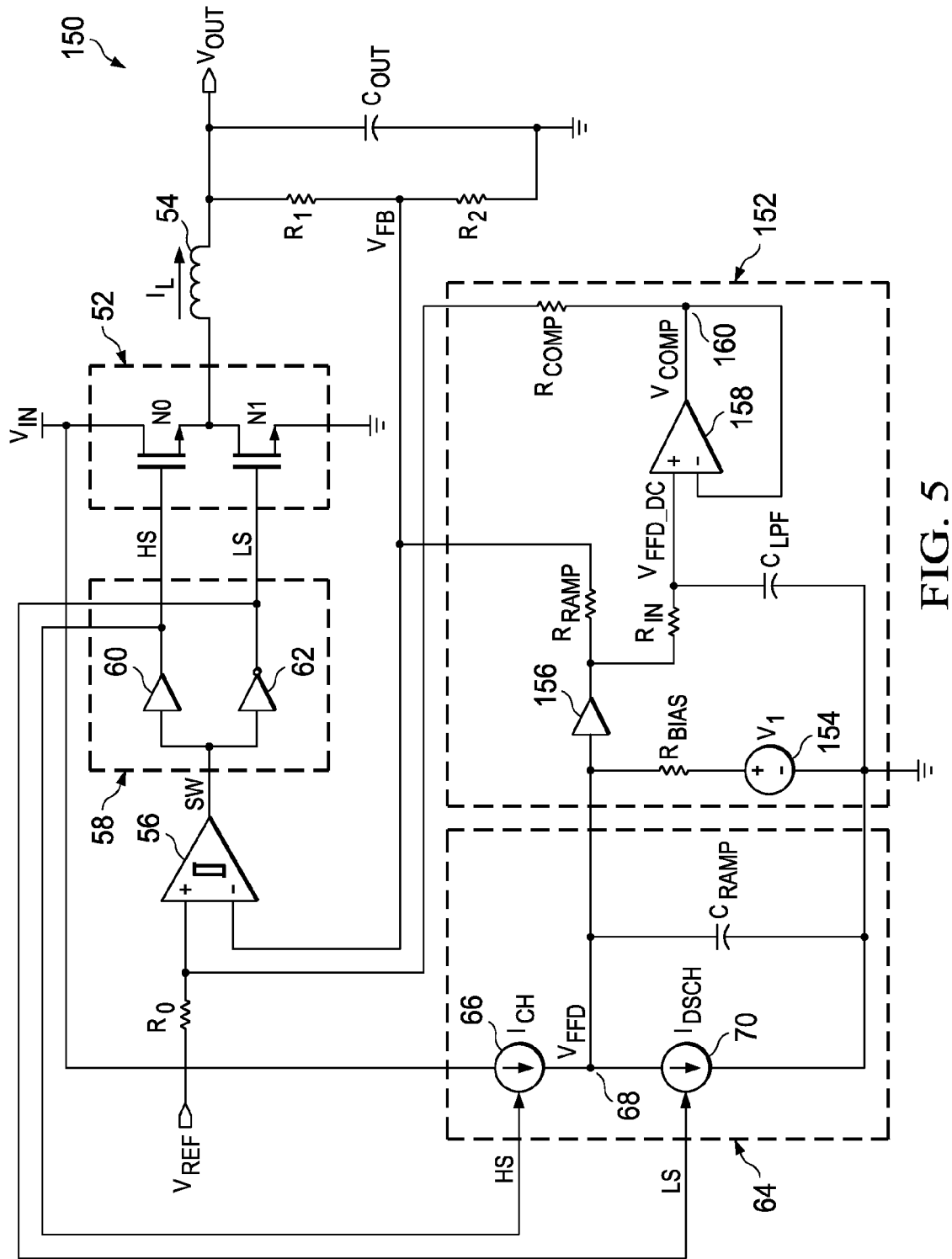
FIG. 5 illustrates another example of a hysteretic switching regulator circuit in accordance with an aspect of the invention.

FIG. 5 illustrates another example of a hysteretic switching regulator circuit 150 in accordance with an aspect of the invention. The hysteretic switching regulator circuit 150 in the example of FIG. 5 is demonstrated as configured substantially similar to the hysteretic switching regulator circuit 50 in the example of FIG. 2. As such, with the exception of the feed-forward compensation stage 72 in the example of FIG. 2, like reference numbers have been used in the description of the example of FIG. 5 as those used in the description of the example of FIG. 2. Specifically, the hysteretic switching regulator circuit 150 includes a switching stage 52, a hysteretic comparator 56, a switch driver 58, and a feed-forward stage 64 that can each operate in the manner described above in the example of FIG. 2.

The hysteretic switching regulator circuit 150 includes a feed-forward compensation stage 152. The feed-forward compensation stage 152 includes a voltage bias 154 that generates a voltage $V_1$ and a resistor $R_{BIAS}$ that interconnects the voltage bias 154 and the node 68. As an example, the voltage $V_1$ can be approximately equal to the reference voltage $V_{REF}$ to provide a balanced DC magnitude of the feed-forward ramp voltage $V_{FFD}$ when the magnitude of the feedback voltage $V_{FB}$ likewise approximately equal to the reference voltage $V_{REF}$, similar to as described above in the example of FIG. 2. The feed-forward compensation stage 152 also includes a buffer 156 that is configured to buffer the feed-forward ramp voltage $V_{FFD}$ to substantially mitigate loading associated with the feed-forward compensation stage 152 and/or the hysteretic comparator 56.

The buffered feed-forward ramp voltage $V_{FFD}$ is provided to a non-inverting input of an OP-AMP 158 via an input resistor $R_{IN}$. A capacitor $C_{LPF}$ interconnects the non-inverting input of the OP-AMP 158 and ground. An output node 160 of the OP-AMP 158 is coupled to an inverting input of the OP-AMP 158. Therefore, the OP-AMP 158 is arranged in a positive amplification configuration, such as to provide a positive or unity gain, such as the unity gain buffer configuration demonstrated in the example of FIG. 5. The capacitor $C_{LPF}$ and the resistor $R_{IN}$ are thus configured as an LPF at the non-inverting input of the OP-AMP 158 to provide a measurement of the DC error of the feed-forward ramp voltage $V_{FFD}$. Accordingly, the OP-AMP 158 generates the compensation voltage $V_{COMP}$ at the output node 160 as having a magnitude that is approximately equal to the magnitude of the DC component, including the error term $dV_{FFD}$, of the feed-forward ramp voltage $V_{FFD}$ in this example of the unity gain configuration of the OP-AMP 158.

A ramp resistor $R_{RAMP}$ interconnects the buffered feed-forward ramp voltage $V_{FFD}$ and the feedback voltage $V_{FB}$. Therefore, the feed-forward ramp voltage $V_{FFD}$ is combined with the feedback voltage $V_{FB}$, such as to set the frequency of the switching control signal SW substantially independent of the input voltage $V_{IN}$ and the output voltage $V_{OUT}$. In addition, the compensation voltage $V_{COMP}$ is combined with the reference voltage $V_{REF}$ via a resistor $R_{COMP}$. Thus, the reference voltage $V_{REF}$ and the feedback voltage $V_{FB}$ are each provided to the hysteretic comparator 56 as including the DC error of the feed-forward ramp voltage $V_{FFD}$. Accordingly, the feed-forward compensation stage 152 substantially cancels the DC error of the feed-forward ramp voltage $V_{FFD}$ to substantially mitigate errors associated with the output voltage $V_{OUT}$ resulting from deviations of the feedback voltage $V_{FB}$ that affect the duty-cycle of the switching control signal SW.

The effect of the DC error of the feed-forward ramp voltage $V_{FFD}$, and thus the operation of the feed-forward compensation stage 152 can be mathematically explained similar to as described above in the example of FIG. 2. However, unlike as described above in the example of FIG. 2, the DC component $V_{FFD\_DC}$ of the feed-forward ramp voltage $V_{FFD}$ is provided at the non-inverting input of the OP-AMP 158. In response to the DC error $dV_{FFD}$ in feed-forward ramp voltage $V_{FFD}$, the compensation voltage $V_{COMP}$ can generate a voltage deviation $V_{COMP\_INPUT}$ through $R_{COMP}$, at the non-inverting input of the comparator, which can thus be expressed as follows:

$$V_{COMP\_INPUT} \approx dV_{FFD} * (R_0/R_{COMP}) \qquad \text{Equation 11}$$

Where: $R_{COMP} >> R_0$.

To substantially mitigate the error in the output voltage $V_{OUT}$ based on the DC error $dV_{FFD}$, Equation 9 and Equation 6 are set to be approximately equal, resulting in the following expressions:

$$V_{COMP\_INPUT} = \Delta V_{FB1} \qquad \text{Equation 12}$$

$$(R_1//R_2)*R_{COMP} = R_0*R_{RAMP} \qquad \text{Equation 13}$$

Accordingly, the resistance magnitudes of the resistors $R_0$, $R_1//R_2$, $R_{COMP}$, and $R_{RAMP}$ can be selected to satisfy Equation 13, and thus to substantially mitigate error in the output voltage $V_{OUT}$ resulting from the DC error $dV_{FFD}$.

It is to be understood that the hysteretic switching regulator circuit 150 is not intended to be limited to the example of FIG. 5. As an example, the hysteretic switching regulator circuit 150 is demonstrated as a buck switching regulator. However, the hysteretic switching regulator circuit 150 can likewise be configured as any of a variety of other types of switching regulators, such as a boost, a negative switching, or a buck-boost regulator. Similarly, as another example, the inductor 14, the output capacitor $C_{OUT}$, and the resistors $R_1$ and $R_2$ could be arranged differently to provide the output voltage $V_{OUT}$ and/or the feedback voltage $V_{FB}$. Furthermore, the feed-forward stage 64 and the feed-forward compensation stage 152 are not limited to as demonstrated in the example of FIG. 5, such that any of a variety of circuit configurations can be implemented to generate the feed-forward ramp voltage $V_{FFD}$ and the compensation voltage $V_{COMP}$. Accordingly, the hysteretic switching regulator circuit 150 can be configured in any of a variety of ways.

Figure 6:
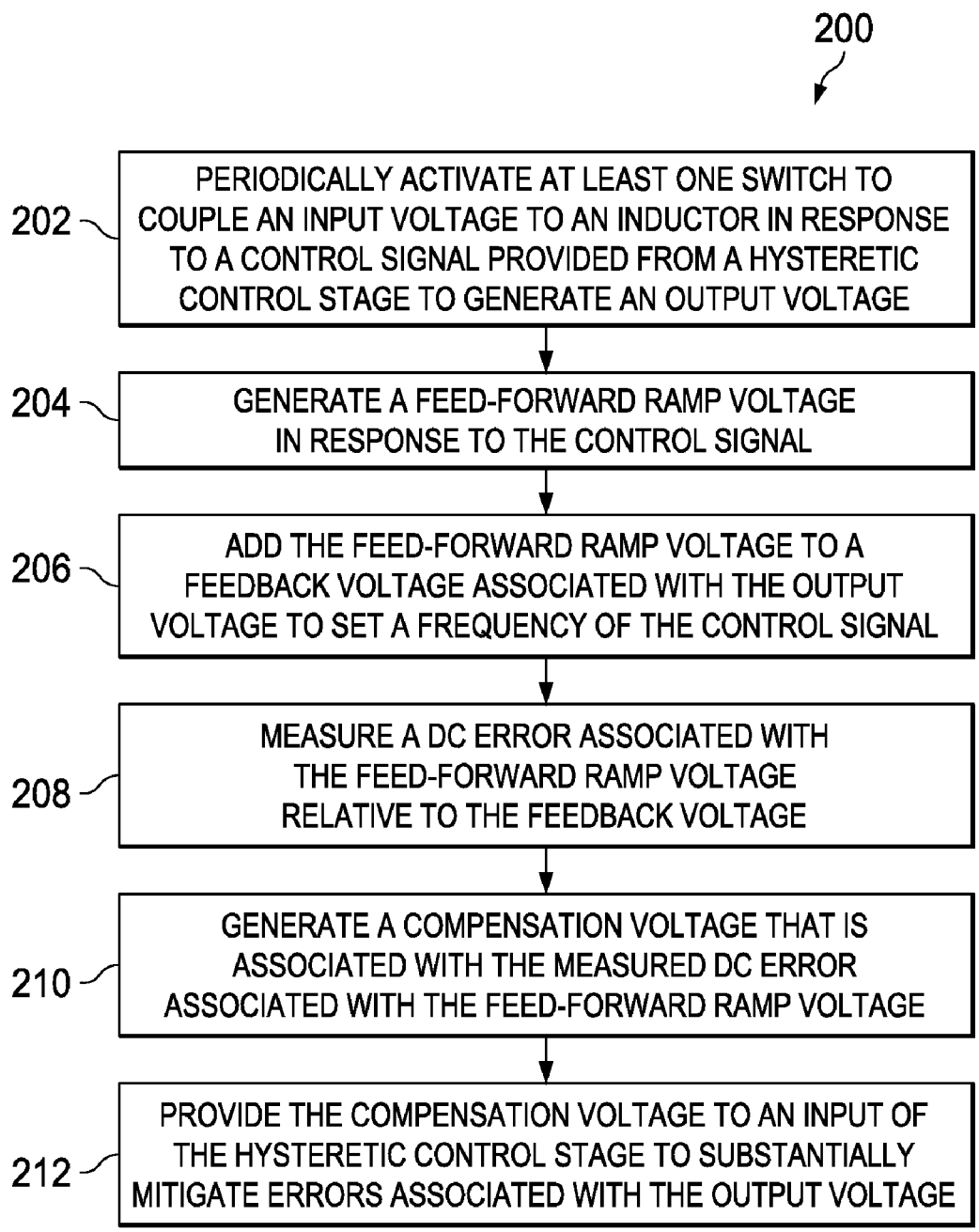
FIG. 6 illustrates an example of a method for providing feed-forward compensation in a hysteretic switching regulator in accordance with an aspect of the invention.

In view of the foregoing structural and functional features described above, certain methods will be better appreciated with reference to FIG. 6. It is to be understood and appreciated that the illustrated actions, in other embodiments, may occur in different orders and/or concurrently with other actions. Moreover, not all illustrated features may be required to implement a method.

FIG. 6 illustrates an example of a method 200 for providing feed-forward compensation in a hysteretic switching regulator in accordance with an aspect of the invention. At 202, at least one switch is periodically activated to couple an input voltage to an inductor in response to a control signal provided from a hysteretic control stage to generate an output voltage. The at least one switch can include a high-side switch and a low-side switch that alternately switches the inductor between the input voltage and ground to generate a current through the inductor that sets the output voltage. The hysteretic control stage can include a hysteretic comparator, and the control signal can include a high-side activation signal and a low-side activation signal that are generated based on the output of the hysteretic comparator.

At 204, a feed-forward ramp voltage is generated in response to the control signal. The feed-forward ramp voltage can be generated by charging and discharging a ramp capacitor in response to the control signal. The charging and discharging can result from activating a first current source in response to a high-side activation signal to charge the ramp capacitor and from activating a second current source in response to a low-side activation signal to discharge the ramp capacitor. At 206, the feed-forward ramp voltage is added to a feedback voltage associated with the output voltage to set a frequency of the control signal. The feed-forward ramp voltage, which is superimposed on a feedback voltage, can be compared with a reference voltage to set a frequency of the control signal independent of the input and output voltages. The feedback voltage can be a voltage-divided version of the output voltage.

At 208, a DC error associated with the feed-forward ramp voltage relative to the feedback voltage is measured. The magnitude of the DC component of the feed-forward ramp voltage could deviate from the reference voltage by a DC error magnitude that could result in error in the output voltage. The measurement of the DC error can occur via an LPF at an input of an OP-AMP in a feed-forward compensation stage. At 210, a compensation voltage that is associated with the measured DC error of the feed-forward ramp voltage is generated. The compensation voltage can be approximately equal to the DC error of the feed-forward ramp voltage. The compensation voltage can be generated at an output of the OP-AMP. At 212, the compensation voltage is provided to an input of the hysteretic control stage to substantially mitigate errors associated with the output voltage. The compensation voltage can be subtracted from one of the feedback voltage or the feed-forward ramp voltage to cancel the DC error from the feedback voltage, or it can be added to the reference voltage such that both the reference voltage and the feedback voltage include the DC error to substantially cancel the DC error. Thus, errors associated with the output voltage resulting from changes in the duty-cycle can be mitigated.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A hysteretic power regulator system comprising:
    a switching stage configured to periodically couple an input voltage to an inductor in response to a control signal to generate an output voltage;
    a hysteretic control stage configured to generate the control signal based on a comparison of a feedback voltage associated with the output voltage and a predetermined reference voltage;
    a feed-forward stage configured to generate a feed-forward ramp voltage in response to the control signal, the feed-forward ramp voltage being added to the feedback voltage to set a frequency of the control signal; and
    a compensation stage configured to cancel a DC error associated with the feed-forward ramp voltage relative to the feedback voltage to substantially mitigate errors associated with the output voltage.

2. The system of claim 1, wherein the compensation stage is configured to measure the DC error associated with the feed-forward ramp voltage and to generate a compensation voltage that is associated with the DC error.

3. The system of claim 2, wherein the compensation voltage is added to the feed-forward ramp voltage to substantially cancel the DC error associated with the feed-forward ramp voltage to substantially mitigate the errors associated with the output voltage.

4. The system of claim 2, wherein the compensation voltage is added to the predetermined reference voltage to add the DC error associated with the feed-forward ramp voltage to the predetermined reference voltage to substantially mitigate the errors associated with the output voltage.

5. The system of claim 1, wherein the compensation stage comprises:
    a low-pass filter configured to filter an AC ramp component from the feed-forward ramp voltage; and
    an operational amplifier (OP-AMP) configured to generate the compensation voltage by providing a sufficient gain to the filtered feed-forward ramp voltage sufficient to achieve the DC error.

6. The system of claim 5, wherein the low-pass filter is configured as a parallel connection of a resistor and a capacitor in a feedback arrangement with respect to the OP-AMP.

7. The system of claim 5, wherein the OP-AMP is configured as an inverting amplifier, such that the compensation voltage is subtracted from one of the feed-forward ramp voltage and the feedback voltage to substantially cancel the DC error associated with the feed-forward ramp voltage.

8. The system of claim 5, wherein the low-pass filter is configured as a capacitor interconnecting the feed-forward ramp voltage and a voltage rail at an input of the OP-AMP.

9. The system of claim 5, wherein the OP-AMP is configured as a non-inverting, unity gain amplifier, such that the compensation voltage is added to the predetermined reference voltage to substantially cancel the DC error associated with the feed-forward ramp voltage.

10. The system of claim 1, wherein the control signal comprises a high-side activation signal and a low-side activation signal, and wherein the feed-forward stage comprises:
    a first current source configured to charge a ramp capacitor associated with the feed-forward ramp voltage in response to the high-side activation signal; and
    a second current source configured to discharge the ramp capacitor in response to the low-side activation signal.

11. A method for providing feed-forward compensation in a hysteretic switching regulator, the method comprising:
    activating at least one switch to periodically couple an input voltage to an inductor in response to a control signal provided from a hysteretic control stage to generate an output voltage;
    generating a feed-forward ramp voltage in response to the control signal;
    adding the feed-forward ramp voltage to a feedback voltage associated with the output voltage to set a frequency of the control signal;
    measuring a DC error associated with the feed-forward ramp voltage relative to the feedback voltage;
    generating a compensation voltage that is associated with the measured DC error of the feed-forward ramp voltage; and
    providing the compensation voltage to an input of the hysteretic control stage to substantially mitigate errors associated with the output voltage.

12. The method of claim 11, wherein providing the compensation voltage comprises adding the compensation voltage to the feed-forward ramp voltage to subtract the DC error from the feed-forward ramp voltage to substantially cancel the DC error associated with the feed-forward ramp voltage.

13. The method of claim 11, further comprising comparing the feedback voltage with a predetermined reference voltage at the hysteretic control stage to generate the control signal, wherein providing the compensation voltage comprises adding the compensation voltage to the reference voltage to add the DC error to the reference voltage to substantially cancel the DC error associated with the feed-forward ramp voltage.

14. The method of claim 11, further comprising generating a high-side activation signal and generating a low-side activation signal in response to the control signal, the high and low-side activation signals being mutually exclusive, wherein generating the feed-forward ramp voltage comprises:
  activating a first current source to charge a ramp capacitor associated with the feed-forward ramp voltage in response to the high-side activation signal; and
  activating a second current source to discharge the ramp capacitor in response to the low-side activation signal .

15. The method of claim 11, wherein measuring the DC error associated with the feed-forward ramp voltage comprises low-pass filtering an AC component of the feed-forward ramp voltage at an input of an operational amplifier (OP-AMP).

16. The method of claim 15, wherein generating the compensation voltage comprises:
  buffering the feed-forward ramp voltage to generate a buffered feed-forward ramp voltage; and
  generating the compensation voltage at the output of the OP-AMP in response to receiving the buffered feed-forward ramp voltage at an input of the OP-AMP.

17. A hysteretic power regulator system comprising:
  means for periodically coupling an input voltage to an inductor in response to the control signal to generate an output voltage;
  means for generating a feed-forward ramp voltage in response to the control signal;
  means for setting a frequency associated with the control signal based on a relative magnitude of a reference signal and a combination of the feed-forward ramp voltage and a feedback voltage that is associated with the output voltage;
  means for measuring a DC error associated with the feed-forward ramp voltage relative to the feedback voltage; and
  means for generating a compensation voltage that is associated with the DC error associated with the feed-forward ramp voltage to substantially cancel the DC error to substantially mitigate errors associated with the output voltage.

18. The system of claim 17, wherein the means for measuring the DC error comprises means for low-pass filtering the feed-forward ramp voltage at an input of the means for generating the compensation voltage.

19. The system of claim 17, wherein the means for generating the compensation voltage is configured to add the compensation voltage to the feed-forward ramp voltage to subtract the DC error from the feed-forward ramp voltage to substantially cancel the DC error associated with the feed-forward ramp voltage.

20. The system of claim 17, wherein the means for generating the compensation voltage is configured to add the compensation voltage to the reference voltage to add the DC error to the reference voltage to substantially cancel the DC error associated with the feed-forward ramp voltage.

* * * * *